(12) United States Patent
Deplazes et al.

(10) Patent No.: US 7,261,186 B2
(45) Date of Patent: Aug. 28, 2007

(54) ELEVATOR WITH TRANSVERSE FLUX DRIVE

(75) Inventors: Romeo Deplazes, Oberrüti (CH); Jörg Evertz, Zurich (CH); Thomas Eilinger, Küssnacht (CH)

(73) Assignee: Inventio AG, Hergiswil NW (CH)

( * ) Notice: Subject to any disclaimer, the term of this patent is extended or adjusted under 35 U.S.C. 154(b) by 305 days.

(21) Appl. No.: 10/902,478

(22) Filed: Jul. 30, 2004

(65) Prior Publication Data

US 2005/0077113 A1   Apr. 14, 2005

(51) Int. Cl.
   *B66B 1/00* (2006.01)
(52) U.S. Cl. .................. 187/277; 310/12; 318/135
(58) Field of Classification Search ............ 187/277, 187/289, 251, 293–297; 310/12, 13; 318/135
   See application file for complete search history.

(56) References Cited

U.S. PATENT DOCUMENTS

| | | | | |
|---|---|---|---|---|
| 5,127,493 | A | * | 7/1992 | Yasuda et al. ............... 187/251 |
| 5,189,268 | A | * | 2/1993 | Pavoz et al. ................. 187/289 |
| 5,203,432 | A | * | 4/1993 | Grinaski ...................... 187/251 |
| 5,235,226 | A | * | 8/1993 | Olsen et al. ................... 310/12 |
| 5,299,662 | A | * | 4/1994 | Reddy et al. ............... 187/251 |
| 5,751,076 | A | * | 5/1998 | Zhou ........................... 310/12 |
| 5,854,521 | A | | 12/1998 | Nolle |
| 6,189,657 | B1 | | 2/2001 | Jessenberger |
| 6,305,501 | B1 | * | 10/2001 | Kahkipuro et al. ......... 187/289 |

FOREIGN PATENT DOCUMENTS

| | | |
|---|---|---|
| DE | 196 34 629 | 8/1997 |
| DE | 200 05 723 | 9/2001 |
| EP | 0 785 102 | 7/1997 |
| EP | 0 858 965 | 8/1998 |
| EP | 0 877 466 | 11/1998 |
| JP | 05024772 A * | 2/1993 |
| WO | WO 02/02451 | 1/2002 |

* cited by examiner

*Primary Examiner*—Jonathan Salata
(74) *Attorney, Agent, or Firm*—Fraser Clemens; Martin & Miller LLC; William J. Clemens

(57) ABSTRACT

An elevator, particularly for transporting passengers, has an elevator car guided in an elevator shaft a direct drive motor. The drive motor includes an active primary part at the elevator car and a passive secondary part that is fixed in the elevator shaft and is spaced from the primary part by an air gap. In order to achieve a high power capability, the drive motor is configured as a transverse flux motor that moves the primary part linearly relative to the secondary part under the influence of an electromagnetic propulsive force. The secondary part has at least one rail made of a soft magnetic material and subdivided into a plurality of segments having a predetermined length. The segments are fixed to a wall of the elevator shaft by intermediate elements.

18 Claims, 12 Drawing Sheets

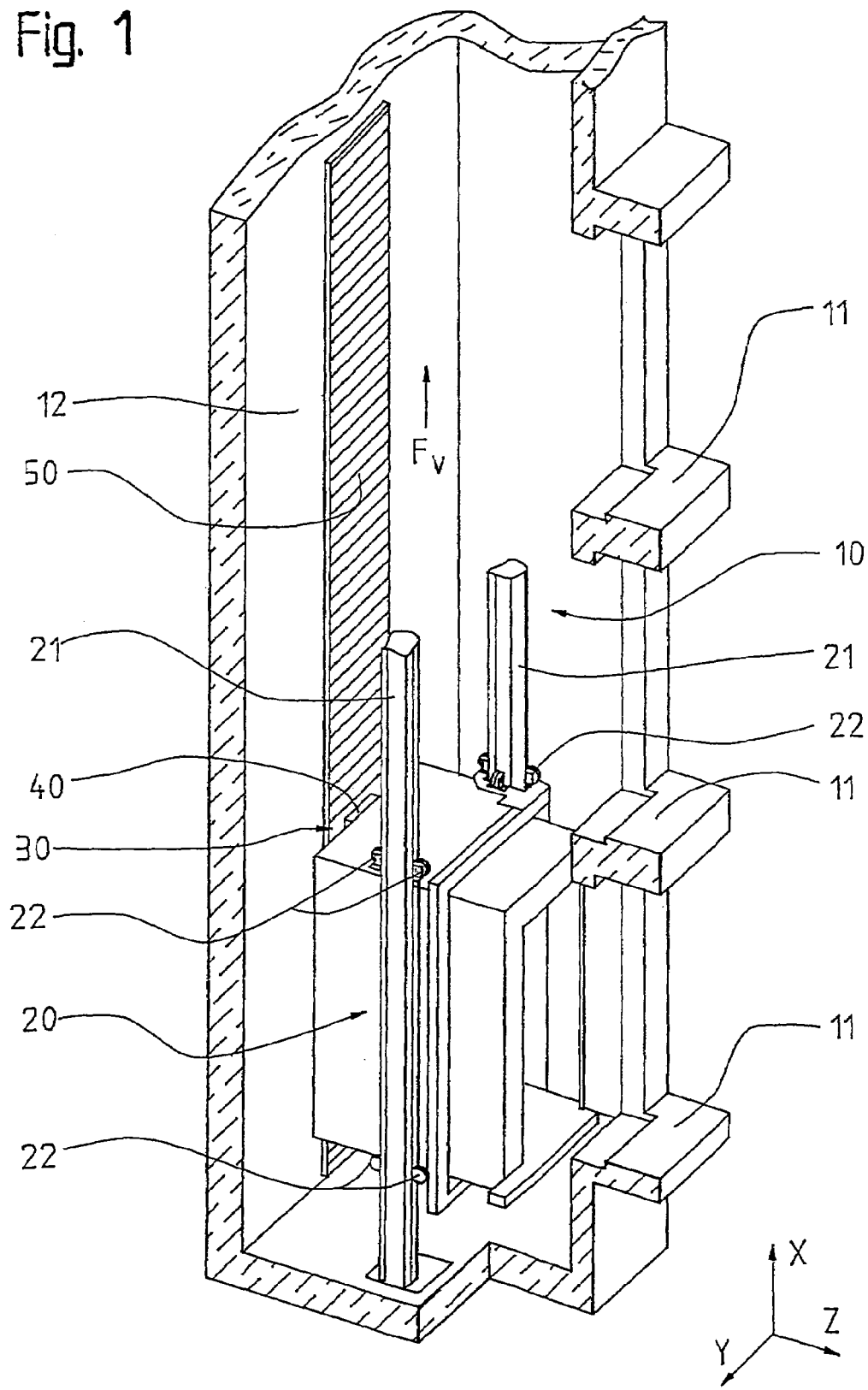

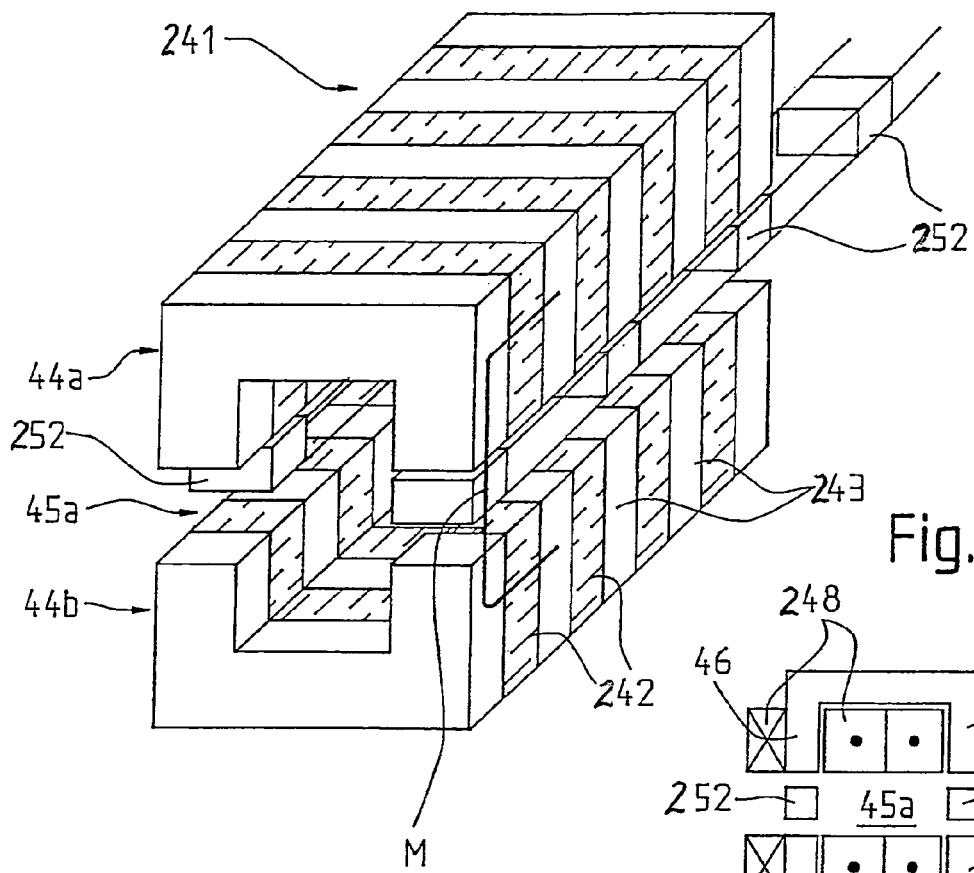
Fig. 4a
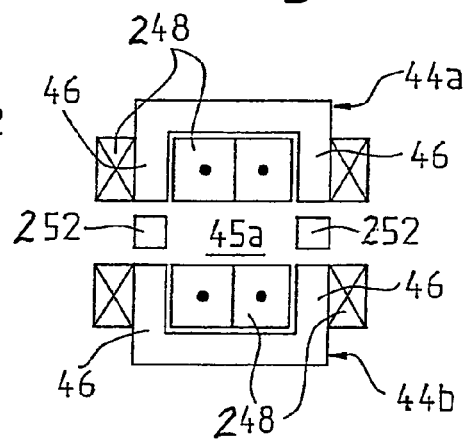
Fig. 4b
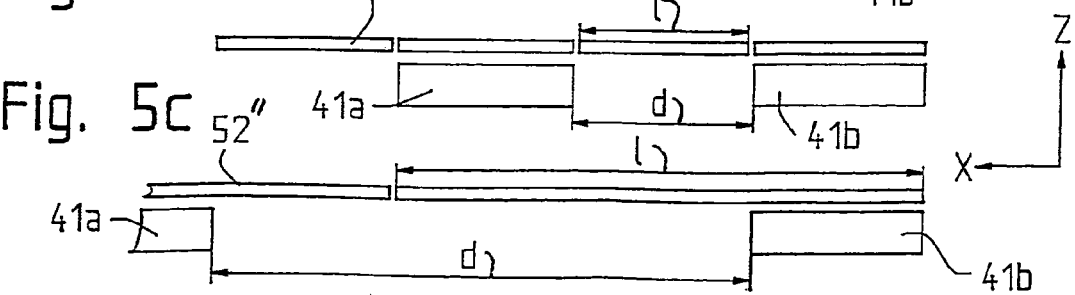
Fig. 5a
Fig. 5b
Fig. 5c

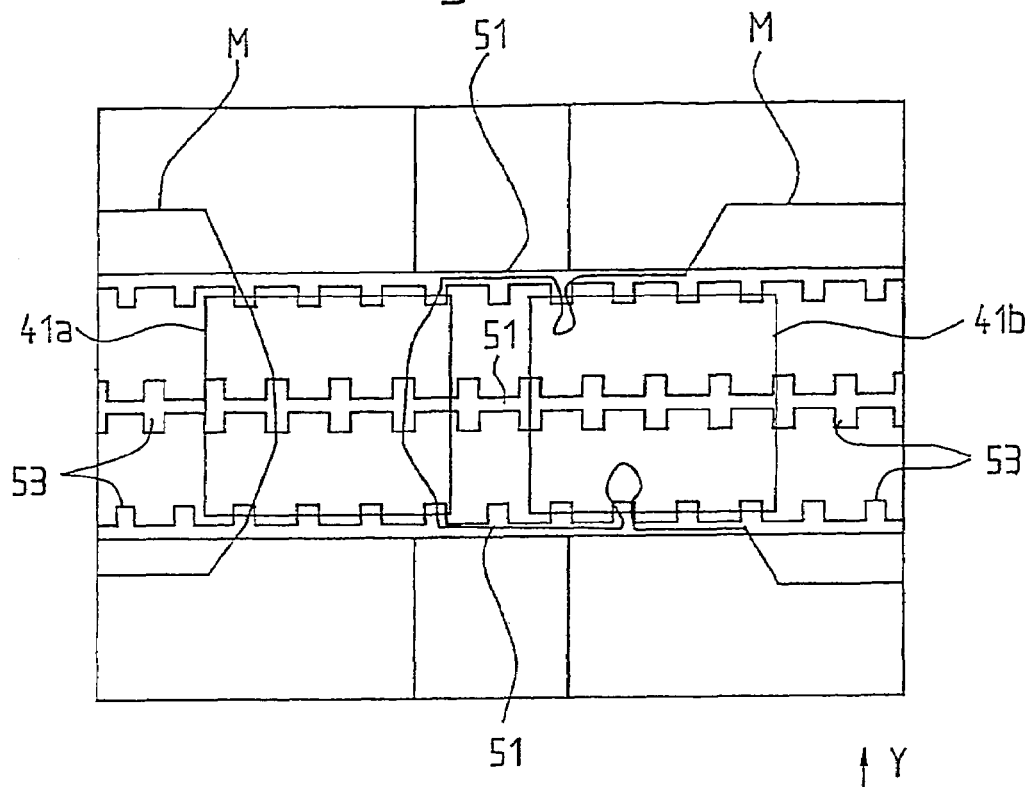
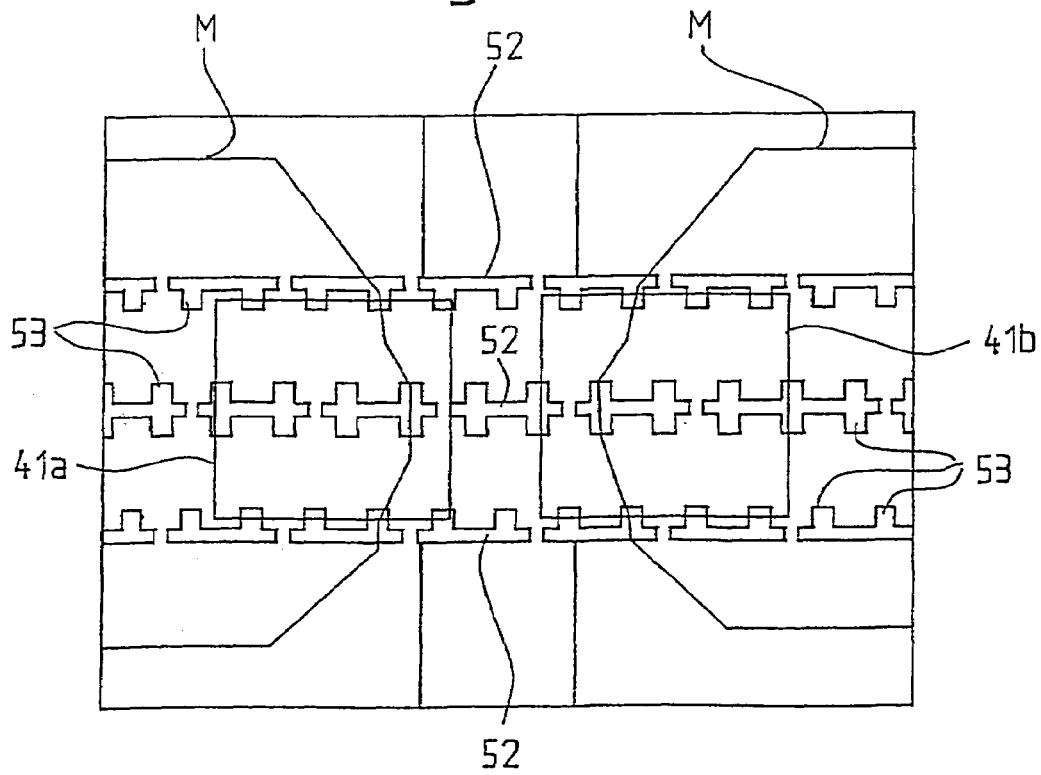

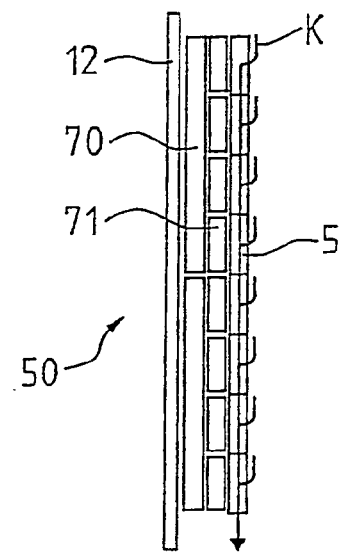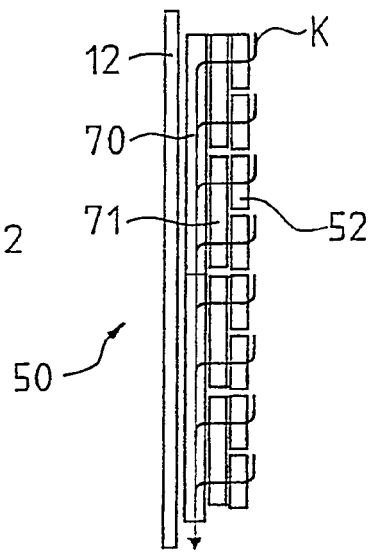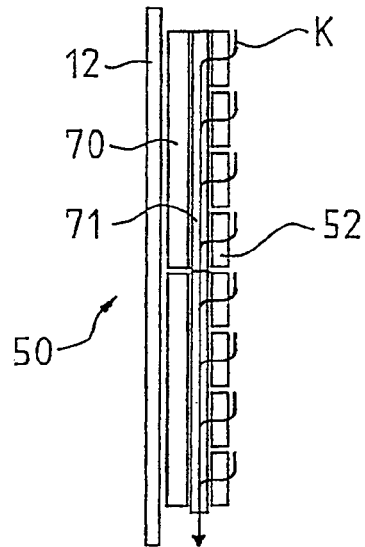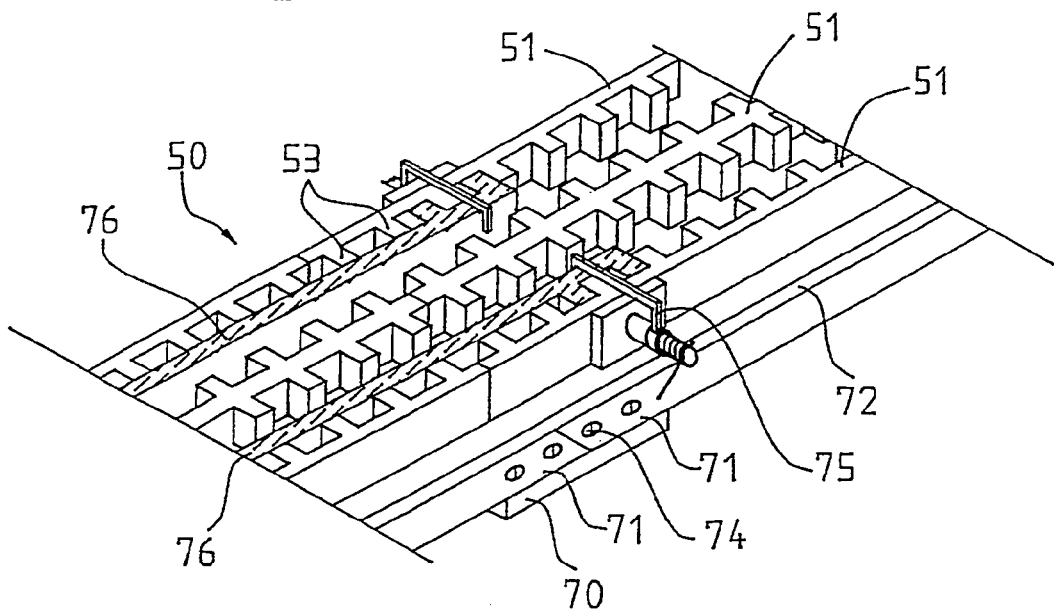

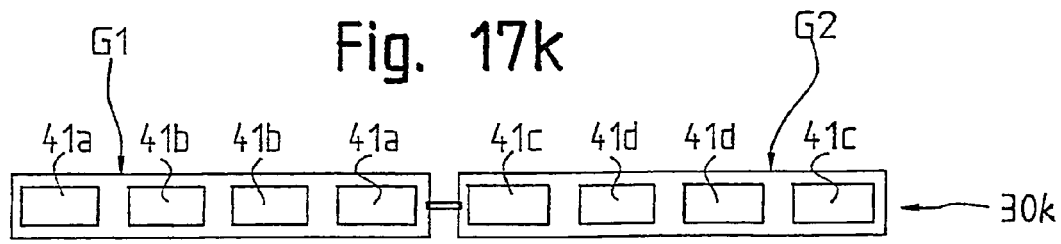
Fig. 17k
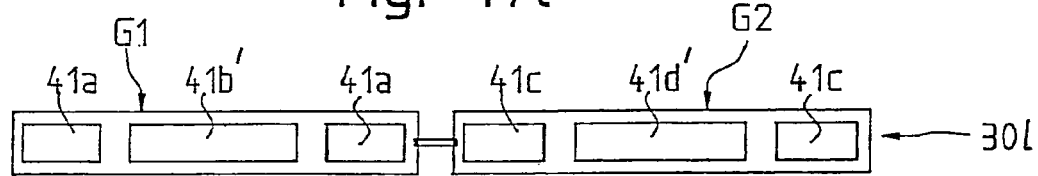
Fig. 17l
Fig. 17h
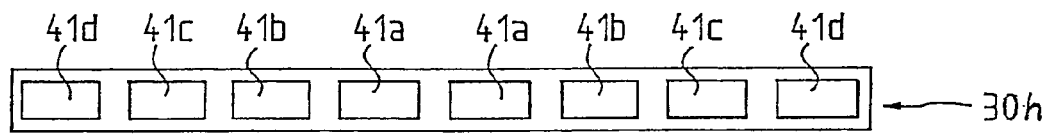
Fig. 17i
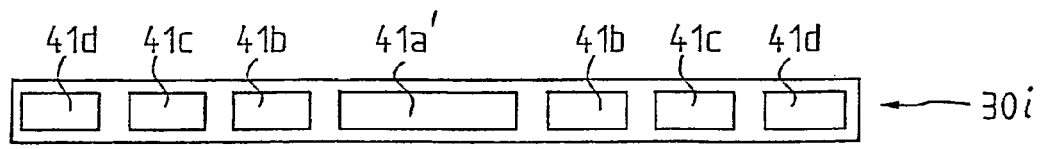
Fig. 17j
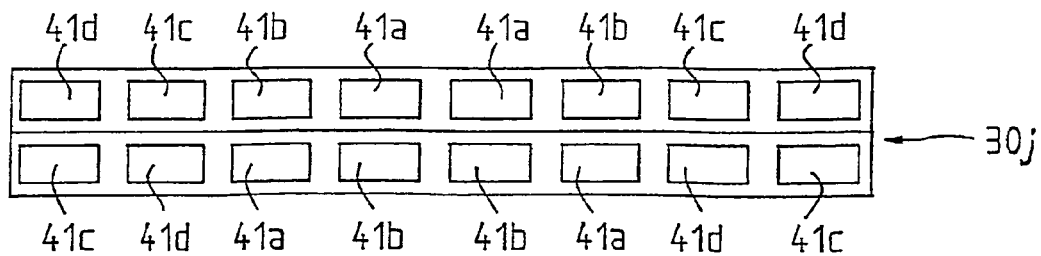

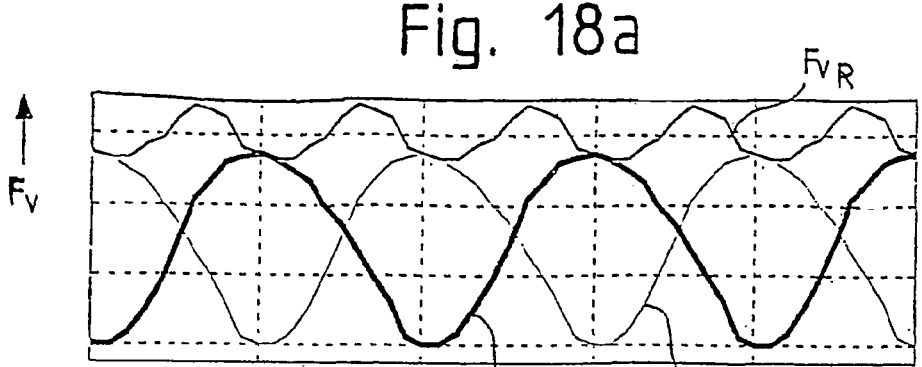
Fig. 18a
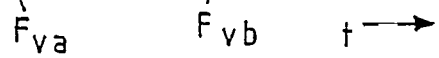
Fig. 18b
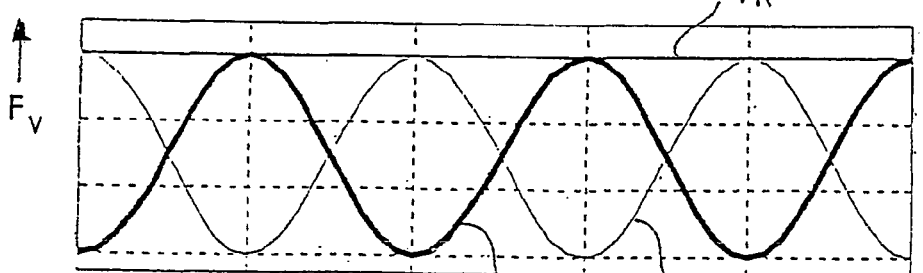
Fig. 19a
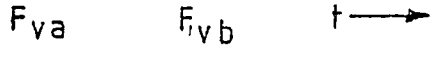
Fig. 19b
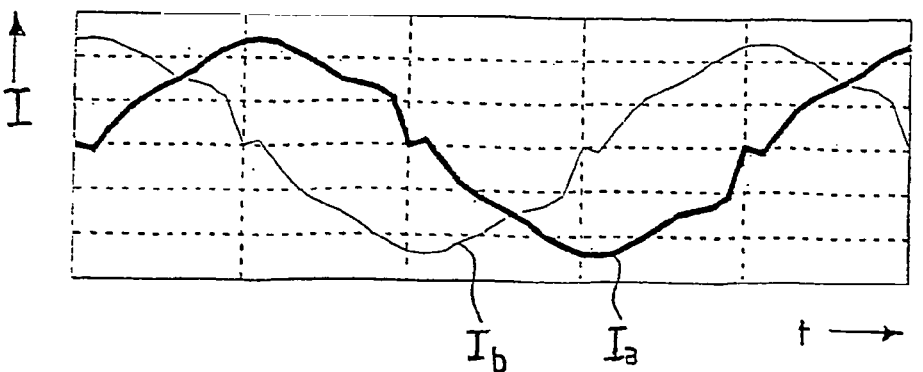

ELEVATOR WITH TRANSVERSE FLUX DRIVE

BACKGROUND OF THE INVENTION

The present invention relates to an elevator, particularly for transporting persons, which comprises an elevator shaft, an elevator car guided in the elevator shaft and a drive motor directly driving the elevator car. The drive motor is provided with an active primary part arranged at the elevator car and a passive secondary part arranged in stationary position in the elevator shaft and spaced from the primary part by an air gap.

The elevator car of conventional elevators is usually moved up and down in the elevator shaft by means of wire cables that run over a drive pulley driven by an electric motor. This indirect drive of the elevator car is associated with the disadvantage of an additional space requirement for the drive pulley and the electric motor.

In addition, elevators that are provided with a direct drive of the elevator car are known in the state of the art. Thus, the European patent document EP 0 785 162 A1 describes an elevator in which the elevator car is driven directly by a linear motor. The linear motor comprises a primary part arranged at the elevator car and a secondary part fastened to the wall of the elevator shaft and provided with permanent magnets. The primary part is provided with windings to which a three-phase current is supplied. In this manner there is created a magnetic traveling field forming electromagnetic forces which linearly move the primary part and thus the elevator car relative to the secondary part.

A linear motor directly driving the elevator car is additionally known from the European patent document EP 0 858 965 A1. With respect to low transverse forces, this linear motor has a secondary part which is arranged at the elevator car and which is formed from two rows of mutually opposite permanent magnets. The primary part, thereagainst, consists of windings that are arranged between the permanent magnets of the secondary part.

The provision of a linear motor for direct drive of the elevator car does indeed have the advantage, in distinction from elevators with an indirect drive by means of cables, that no additional space requirement for an electric motor and a drive pulley is needed. Moreover, the provision of a linear motor makes a counterweight connected with the elevator car redundant. An insufficient power capability and a manufacturing cost that is comparatively high in the economic respect have proved to be disadvantages of the known linear motors particularly in the case of relatively high elevator shafts. With respect to manufacturing cost, it is possibly required to provide the entire wall of the elevator shaft with either the secondary part or the primary part. Since the primary part comprises several windings and the secondary part is equipped with permanent magnets, comparatively high costs thus result.

SUMMARY OF THE INVENTION

The present invention is based on the object of developing an elevator of the kind stated above in the respect that a comparatively high power capability of the drive motor directly driving the elevator car can be achieved with comparatively favorable production costs.

According to the present invention, for fulfillment of this object, in the case of an elevator with the above-mentioned features, the drive motor is formed as a transverse flux motor which moves the primary part linearly relative to the secondary part under the influence of an electromagnetic propulsive force, wherein the secondary part comprises at least one rail which is made of a soft magnetic material and which is subdivided into a plurality of segments of predetermined length and wherein the segments are fastened to a wall of the elevator shaft by means of intermediate elements.

An elevator of that kind makes use of the knowledge that a comparatively high force density results in the case of a transverse flux machine. This is because by contrast to linear motors operating in accordance with the longitudinal flux principle, the magnetic flux in the case of transverse flux motors is guided perpendicularly to the direction of movement with the consequence that relatively small pole pitches, which lead to a large force density, can be realized.

The construction of the secondary part as a rail made from a soft magnetic material ensures a comparatively economic production and enables simple mounting in the elevator shaft. Since the magnets and windings, which are required for producing the magnetic flux, are arranged in the moved primary part it is sufficient to make the passive secondary part out of a soft magnetic material more favorable in economic respect. By soft magnetic material in the sense of the present invention there is understood a material which can be readily magnetized and demagnetized, such as, for example, iron or ferrite. The rail can additionally be made of a solid material or be laminated with the soft magnetic material.

For producing a magnetic flux running transversely to the direction of movement of the elevator car the primary part advantageously comprises an excitation module which is provided with at least one collector, which is composed of alternately arranged magnets and soft magnetic intermediate elements, as well as with at least one excitation winding extending in the direction of movement of the elevator car, wherein the magnets are arranged in the collector for formation of a predetermined pole pitch with alternating polarity.

The provision of the excitation module enables a modular construction of the primary part. Thus, for example, depending on the respectively required performance capability several excitation modules can be arranged adjacent to one another and/or one after the other. The spacing of the magnets in the collector corresponds with the pole pitch, wherein the magnetic flux produced by the magnets is transmitted by way of the soft magnetic intermediate elements to the secondary part. The magnets are usefully constructed as permanent magnets and for this purpose consist of, for example, a rare earth metal, such as, for example, neodymium.

In order to prevent, in the case of presence of several excitation modules, an unfavorable magnetic coupling of the magnetic fields produced by the excitation modules from arising, the rail is subdivided into a plurality of segments spaced apart in the direction of movement of the elevator car. If the spacing between the excitation modules is selected to be at least the length of the longest segment, then it is excluded that two excitation modules arranged one behind the other cooperate with one and the same segment. This is because the air gap, which results through the spaced arrangement of the segments, between the individual segments represents a resistance for the magnetic flux, which counteracts dispersion of the magnetic flux. The segmentation in accordance with the invention of the rail thus contributes to the magnetic field lines running predominantly in the transverse direction, i.e. perpendicularly to the direction of movement of the elevator car. Due to the arrangement of the segments on the intermediate elements a simple mounting and precise alignment of the segments is, in addition, taken into account.

Thus, in the constructional respect it is of advantage to arrange the intermediate elements on support elements fastened to the wall of the elevator shaft. It is of further advantage to make the intermediate elements and the support elements of a non-magnetic material, preferably aluminum, in order to avoid a disturbing influence on the magnetic flux. The intermediate elements and the support elements are preferably made from the same material so that they have the same thermal coefficient of expansion. Thermally induced stresses between the intermediate elements and the support elements are thus prevented.

The segments can advantageously be connected together and the intermediate elements spaced apart in the direction of movement of the elevator car. In the case of such an embodiment the force flow predominantly runs through the segments. In a particularly preferred embodiment of the elevator according to the present invention the segments are spaced apart, however, in the direction of the movement of the elevator car and the intermediate elements connected together so that the force flow is taken up principally by the intermediate elements. The support elements receiving in both cases only still kinking forces can be spaced apart in the direction of movement of the elevator car in order to make possible a thermally induced length expansion. Depending on the respective case of use it is also possible to omit the support elements. Alternatively, the segments and the intermediate elements can be spaced apart in the direction of movement of the elevator car and the support elements connected together so that the force flow is conducted predominantly through the support elements.

In correspondence with a preferred development of the elevator according to the present invention the intermediate elements are provided with a guide surface for guidance of the primary part in a transverse direction, which is perpendicular to the movement direction, of the elevator car. Alternatively or additionally the intermediate elements can be provided with a guide surface for guidance of the primary part in a normal direction, which is perpendicular to the movement direction and the transverse direction, of the elevator car.

The segments are preferably provided with a fastening part that is connected with the intermediate elements in force-locking manner and/or shape-locking manner and/or material-locking manner. Such an embodiment enables a simple mounting and reliable fastening of the segments on the intermediate elements. In order to ensure a simple and precise alignment of the segments on the intermediate elements the fastening part is provided with projections and is inserted in shape-locking manner in a correspondingly formed groove of the intermediate element.

With respect to economic production it is advantageous to provide the segments with the same length. In order to avoid vibrations of the elevator car and guarantee a low-noise movement of the primary part on the rails, the ends of the intermediate end elements are advantageously chamfered.

Finally, in an advantageous development of the elevator according to the present invention the rail is provided with equidistantly arranged teeth on at least one side, wherein a tooth pitch, which is formed by the teeth, of the rail is an integral multiple of the pole pitch of the collector. Through the provision of the rail with teeth there results a high magnetic flux density between primary part and secondary part and thus a comparatively large force density. If the secondary part is formed by several rails arranged, for example, adjacent to one another, it is advantageous to arrange the rails in such a manner that the tooth pitches of the rails are arranged to be displaced relative to one another. This is because in this way transverse forces which arise can be minimized.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a schematic perspective view of an elevator installation according to the present invention;

FIG. 2b is a front elevation view of the excitation module shown in FIG. 2a;

FIG. 3b is a front elevation view of the excitation module shown in FIG. 3a;

FIG. 4a is a perspective view of an excitation module in a third embodiment of the drive motor for the elevator shown in FIG. 1;

FIG. 4b is a front elevation view of the excitation module shown in FIG. 4a;

FIGS. 5a through 5c are schematic illustrations of the size relationships of the excitation modules and the segments of the rail shown in FIG. 1;

FIG. 6a is a schematic illustration of the course of the magnetic field lines in the case of two excitation modules arranged one after the other and a continuous rail according to the present invention;

FIG. 6b is a schematic illustration of the course of magnetic field lines in the case of two excitation modules arranged one after the other and a segmented rail according to the present invention;

FIG. 9a a schematic illustration of the force flow in the case of interconnected segments of the secondary part of the drive motor;

FIG. 9b is an illustration of the force flow in the case of interconnected support elements of the secondary part of the drive motor;

FIG. 9c is an illustration of the force flow in the case of interconnected intermediate elements of the secondary part of the drive motor;

FIG. 10 is a perspective view of the secondary part of the drive motor;

FIGS. 17a through 17l are schematic illustrations of different arrangements of the excitation modules of the drive motor;

FIG. 18a is a plot of the propulsive force generated by the drive motor in the case of unregulated current strength;

FIG. 18b is a plot of the current strength in the drive motor in the case of unregulated current strength;

FIG. 19a is a plot of the propulsive force generated by the drive motor in the case of regulated current strength;

FIG. 19b is a plot of the current strength in the drive motor in the case of regulated current strength.

DESCRIPTION OF THE PREFERRED EMBODIMENT

Figure 2A:
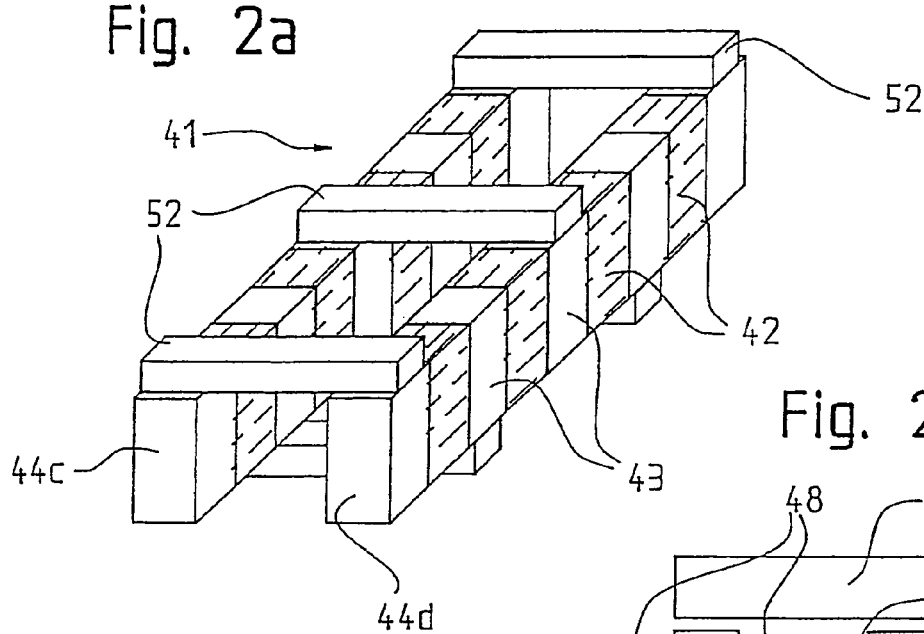
FIG. 2a is a perspective view of an excitation module in a first embodiment of the drive motor for the elevator shown in FIG. 1.

In the case of the elevator installation illustrated in FIG. 1, an elevator car 20 is arranged to be movable, in a direction "X", in an elevator shaft 10 extending over several floors 11. The elevator car 20 is provided with several guide rollers 22 that move the elevator car 20 along guides or guide rails 21 arranged in the elevator shaft 10.

The elevator car 20 is directly driven by a drive motor 30. For this purpose the drive motor 30, which is designed as a transverse flux motor, comprises an active primary part 40 and a passive secondary part 50. The primary part 40 is arranged at the elevator car 20, while the secondary part 50 is fastened to a wall 12 of the elevator shaft 10 and is spaced from the primary part 40 by an air gap. The primary part 40 is linearly movable relative to the secondary part 50 under the influence of an electromagnetically generated propulsive force $F_v$.

As can be seen particularly in FIGS. 2a through 4b, the primary part 40 comprises an excitation module 41, 141, 241 for producing a magnetic flux running transversely to the direction "X" of movement of the elevator car 20. The excitation module 41, 141 or 241 is provided with at least one collector 44a through 44e as well as with at least one excitation winding 48, 148, 248 extending in the direction "X" of movement of the elevator car 20. The collectors 44a through 44e are composed of several permanent magnets 42, 142, 242 arranged in alternation with intermediate or spacer elements 43, 143, 243 made from a soft magnetic material.

The permanent magnets 42, 142, 242 are arranged with alternating polarity in the collectors 44a through 44e and form a pole pitch.

Figure 2B:
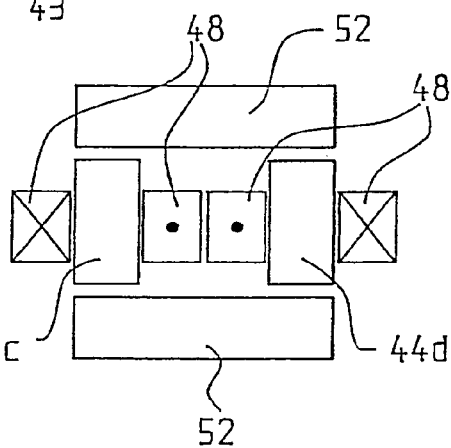

The first embodiment, which is shown in FIGS. 2a and 2b, of the excitation module 41 comprises the two collectors 44c, 44d which are constructed to be substantially I-shaped and arranged parallel to one another in the direction "X" of movement of the elevator car 20 and are each provided with a respective one of the excitation windings 48. With respect to a material-saving design, the feedback of the excitation winding 48, which usually consists of copper, in the case of arrangement of several of the excitation modules 41 can be utilized in order to excite an adjacent collector.

Figure 3A:
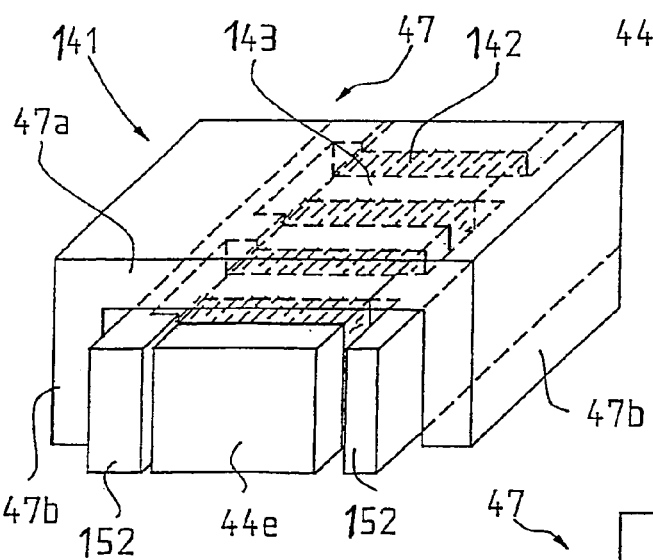
FIG. 3a is a perspective view of an excitation module in a second embodiment of the drive motor for the elevator shown in FIG. 1.
Figure 3B:
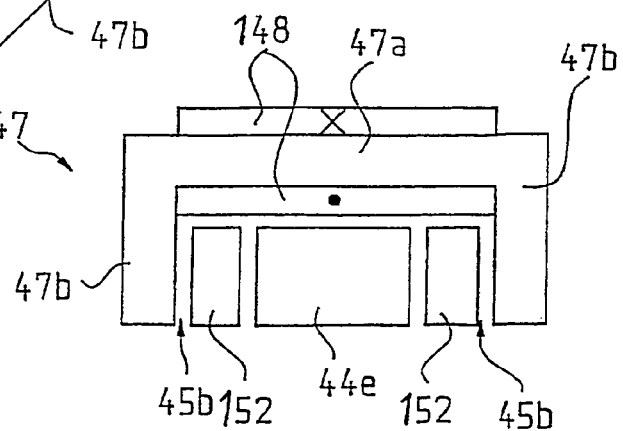

The second embodiment, which is shown in FIGS. 3a and 3b, of the excitation module 141 comprises a yoke 47 which surrounds the collector 44e at three sides and which is composed of a base plate 47a, which is provided with the excitation winding 148, and two limbs 47b. The limbs 47b are each spaced from the collector 44e by a respective intermediate space 45b and extend along two opposite sides of the collector 44e. The secondary part 50, which is constructed as a rail 51 subdivided into segments 152, is arranged in the intermediate space 45b. The yoke 47 serves the purpose of ensuring a magnetic return flux from the segments 152 of the rail 51 to the primary part 40. In an alternative of the second embodiment, the excitation module 41 can comprise two or more of the collectors 44e. The yoke 47 then has a further one of the limbs 47b for each additional collector 44e in order to ensure the magnetic return flux. If several excitation modules 141 are arranged adjacent to one another, then the yoke 47 and the excitation winding 148 can be designed in such a manner that the yoke 47 and/or the excitation winding 148 of several collectors 44c are used at the same time. A lightweight and material-saving mode of construction is thus guaranteed.

In a third embodiment, which is shown in FIGS. 4a and 4b, of the excitation module 241 is provided with the two collectors 44a, 44b which are constructed to be substantially U-shaped and face one another by their open sides and which are arranged to be spaced apart by an intermediate space 45a. The collectors 44a, 44b have limbs 46 which are respectively provided with the excitation windings 248 extending in the direction "X" of movement of the elevator car 20. Segments 252 of the rail 51 are arranged in the intermediate space 45a.

As is apparent from FIG. 4a, on supply of a three-phase current to the excitation winding 248 a magnetic flux M, which flows through the secondary part 50 and runs transversely to the direction "X" of movement of the elevator car 20, results. The magnet flux M of that kind also arises in the case of the forms of embodiment of the excitation modules 41, 141 according to FIGS. 2a through 3b. The first embodiment shown in FIGS. 2a and 2b differs from the remaining embodiments of the excitation module in that, however, segments 52 of the rail 51 are not arranged between two collectors, but the collectors 44c, 44d extend between the segments 52. For producing the magnetic flux M running transversely to the direction "X" of movement of the elevator car 20 this reversal of the arrangement of collectors 44c, 44d and the segments 52 is without significance.

FIGS. 5a through 5c allow recognition that the rail 51 formed from a soft magnetic material, such as, for example, iron or ferrite, is composed of a plurality of the segments 52, 152 or 252 of equal length "1" spaced apart in the direction "X" of movement of the elevator car 20. The rail 51 is further provided with a plurality of teeth 53, as is apparent from FIGS. 6a and 6b. Regardless of the segmentation of the rail 51 into the individual segments 52, 152, 252 the teeth 53 are equidistantly arranged. The tooth pitch, which is formed in this manner, of the rail 51 corresponds with an integral multiple of the pole pitch of the collectors 44a to 44e, for example twice the pole pitch. The teeth 53 can be arranged on one side or on two sides of the rail 51 and extend in the transverse direction. As further apparent from FIGS. 6a and 6b, the secondary part 50 can consist of several of the rails 51. The teeth 53 are in this case arranged in such a manner that the tooth pitches of the rails 51 are arranged to be displaced relative to one another.

Several of the excitation modules 41a, 41b are arranged one after the other in the direction "X" of movement of the elevator car 20 in such a manner that a spacing "d" between two excitation modules 41a, 41b amounts to at least the length "1" of the longest segment 52, 52', 52" as FIGS. 5a through 5c show. In this manner it is ensured that independently of the length of the segments 52, 52', 52" the two excitation modules 41a, 41b do not co-operate at the same time with one and the same segment 52, 52', 52". A dispersion of the magnetic flux M due to a coupling of the magnetic fields produced by excitation modules 41a, 41b, as shown in FIG. 6a on the basis of continuous rails 51, can thus be largely avoided, as is apparent from FIG. 6b.

The spacer elements 43, 143, 243 of the collectors 44a through 44e, the yoke 47 of the excitation module 141 shown in FIGS. 3a and 3b and the rails 51 represent passive components, i.e. components that are merely field-conducting. In order to achieve a targeted field conductance, these passive components can be constructed as a plate stack, which is composed of electrically mutually insulated plates of, for example, soft iron. Such a plate stack can advantageously be made by cementing. In this case the individual plates are provided at one side or both sides with a glue layer and after stacking one on the other are glued together by the action of pressure and heat. Cementing has, by contrast to other production methods such as, for example, welding, punch-stacking or riveting, the advantage that a short circuit, which prejudices conduction of the magnetic flux M, between two or more plates is avoided.

Figure 7:
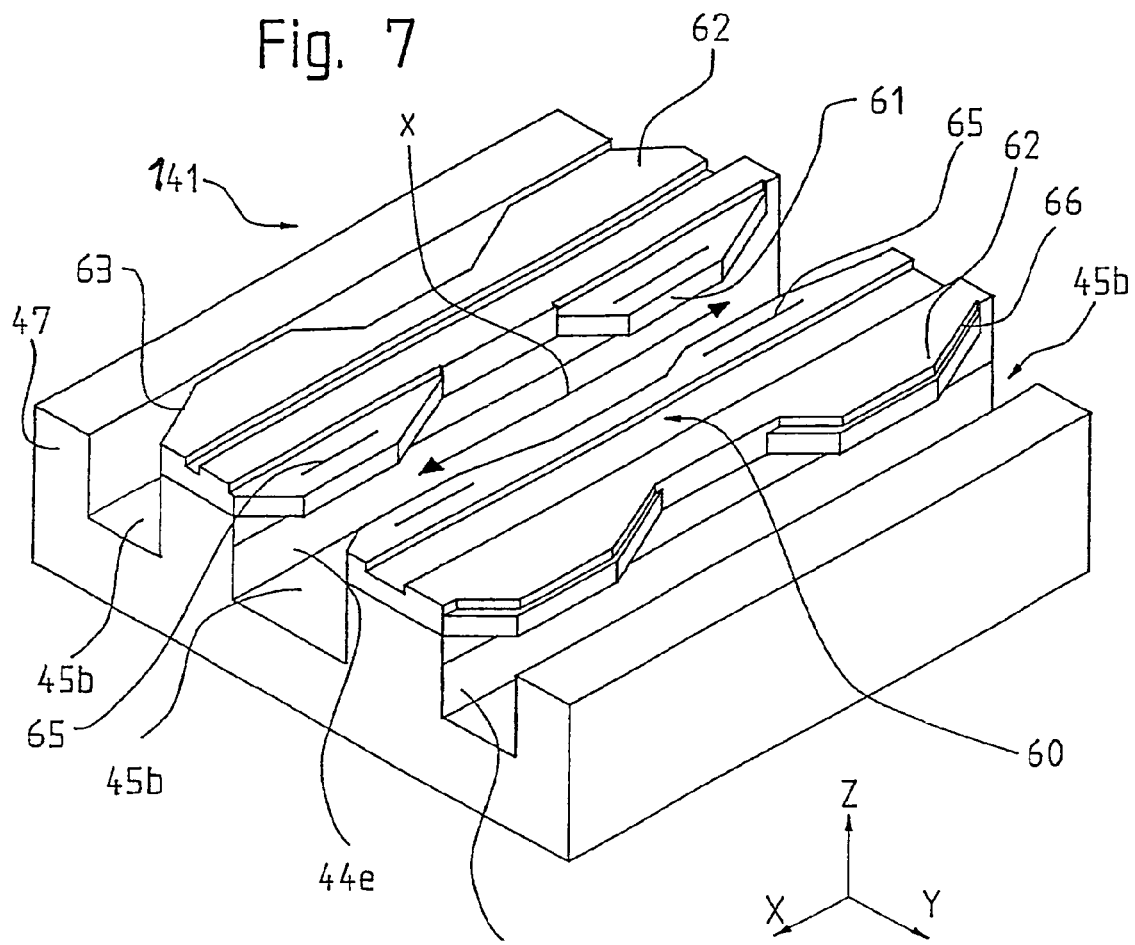
FIG. 7 is a perspective view from below of an excitation module provided with a slide shoe according to the present invention.

The excitation modules 41, 141, 241 can be provided with guide rollers or a slide shoe 60 in order to ensure reliable guidance on the rails 51. As shown in FIG. 7 on the basis of the excitation module 141 similar to the form of embodiment shown in FIGS. 3a and 3b, the slide shoe 60 is arranged at the underside of the collector 44e. The collector 44e clamped in place in this manner between the slide shoe 60 and the yoke 47 thus experiences a reliable fastening. The slide shoe 60 is provided with a sliding guide surface 61 for guidance in a transverse direction "Y", which is perpendicular to the direction "X" of movement of the elevator car 20. Beyond that the slide shoe 60 has a sliding guide surface 62 for guidance in a normal direction "Z", which is perpendicular to the movement direction "X" and the transverse direction "Y" of the elevator car 20. In order to ensure a low-vibration introduction of the segments 52 of the guide rail 51 into the intermediate space 45b the sliding guide surface 61 is provided with chamfers 63 for guidance in the transverse direction "Y". Further contribution to a low-vibration and thus low-noise guidance of the excitation module 141 on the rails 51 is made by the provision in the slide shoe 60 of slot-like recesses 65, 66 which extend parallel to the sliding guide surfaces 61, 62. By reason of the recesses 65, 66, the sliding guide surfaces 61, 62 are designed to be resilient. This resilient design ensures that the air gap required between the primary part 40 and secondary part 50 for a relative movement remains constant during movement of the excitation module 141.

Figure 8:
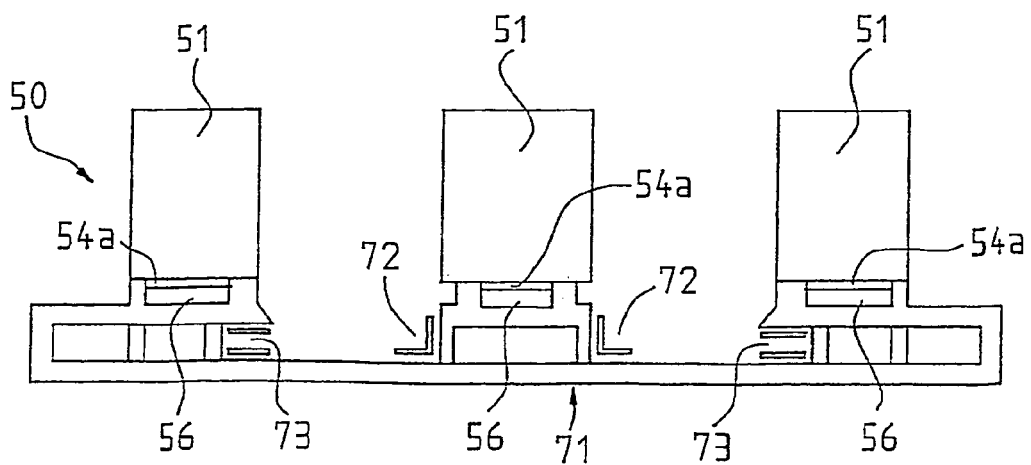
FIG. 8 is a schematic end view of rails fastened to an intermediate element in accordance with the present invention.

The secondary part 50 designed in correspondence with the excitation module 141 shown in FIG. 7 is illustrated in FIG. 8. The secondary part 50 comprises three of the rails 51 which engage in the intermediate spaces 45b of the excitation module 141. The rails 51 are arranged on an intermediate mounting element 71, which is fastened to the wall 12 of the elevator shaft 10, by means of a fastening part 54a engaging in a groove 56. The intermediate element 71 is provided with guide surfaces 72, 73 which co-operate with the straight guide surfaces 61, 62 of the slide shoe 60 for reliable guidance of the excitation module 141.

As apparent from, in particular, FIG. 1, the elevator car 20 is directly driven by the drive motor 30. A wire cable, as in the case of indirectly driven conventional elevators, is not required. In order to reduce the propulsive force $F_v$ required for movement of the elevator car 20, a counterweight connected with the elevator car 20 can, nevertheless, be provided. In this case it is possible to arrange a further primary part 40 of the drive motor 30 at the counterweight. Alternatively, it is also possible to provide only the one primary part 40 which is fastened to the counterweight.

As can be recognized in FIGS. 9a to 9c, the support elements 70, on which the intermediate mounting elements 71 carrying the segments 52, 152, 252 are arranged, are fastened to the wall 12 of the elevator shaft 10. The support elements 70 and the intermediate elements 71 are made of a non-magnetic material, such as, for example, aluminum. FIGS. 9a to 9c clarify the course of the force flow K, which is conducted into the secondary part 50, in the case of different arrangements of the segments 52, 152, 252 the intermediate elements 71 and the support elements 70. In the case of the embodiment shown in FIG. 9a only the segments 52 are connected together. The force flow K in this case runs predominantly through the segments 52. In FIG. 9b, thereagainst, only the support elements 70 are connected together. The force flow K therefore runs from the segments 52 to the support elements 70 by way of the intermediate elements 71. In the case of embodiment shown in FIG. 9c only the intermediate mounting elements 71 are connected together, so that the force flow K is conducted from the segments 52 to the intermediate elements 71. The embodiment shown in FIG. 9c has proved particularly advantageous. The segments 52 in this case are spaced apart from one another so that a magnetic coupling of two excitation modules 41a, 41b arranged one after the other can be avoided, as shown in FIG. 6b. In addition, the interconnected intermediate elements 71 enable a precise arrangement and alignment of the segments 52 and a reliable guidance of the excitation module 41. The intermediate elements 71 and the support elements 70 made of the same material have the same coefficients of thermal expansion so that thermally induced changes in length do not produce any stresses, which impair the force flow K, between the support elements 70 and the intermediate elements 71. Since the force flow K is derived by way of the intermediate elements 71, the support elements 70 take up merely kinking forces. Depending on the respective case of use it can therefore be sufficient to omit the support element 70 and to fasten the intermediate mounting elements 71 directly to the wall 12 of the elevator shaft 10.

An accurate alignment of the segments 52, 152, 252 is required for a low-vibration and low-noise guidance of the excitation modules 41, 141, 241 on the rails 51. As can be recognized in FIG. 10, the segments 52 arranged on the intermediate elements 71 can be aligned in the transverse direction "Y" by the intermediate elements 71. For this purpose the intermediate mounting elements 71 are fastened on the support elements 70 by means of screws 74. Aligning plates 76, which by means of thumbscrews 75 adjust several segments 52 arranged in succession, can be used for alignment in the movement direction "X".

Figure 11:
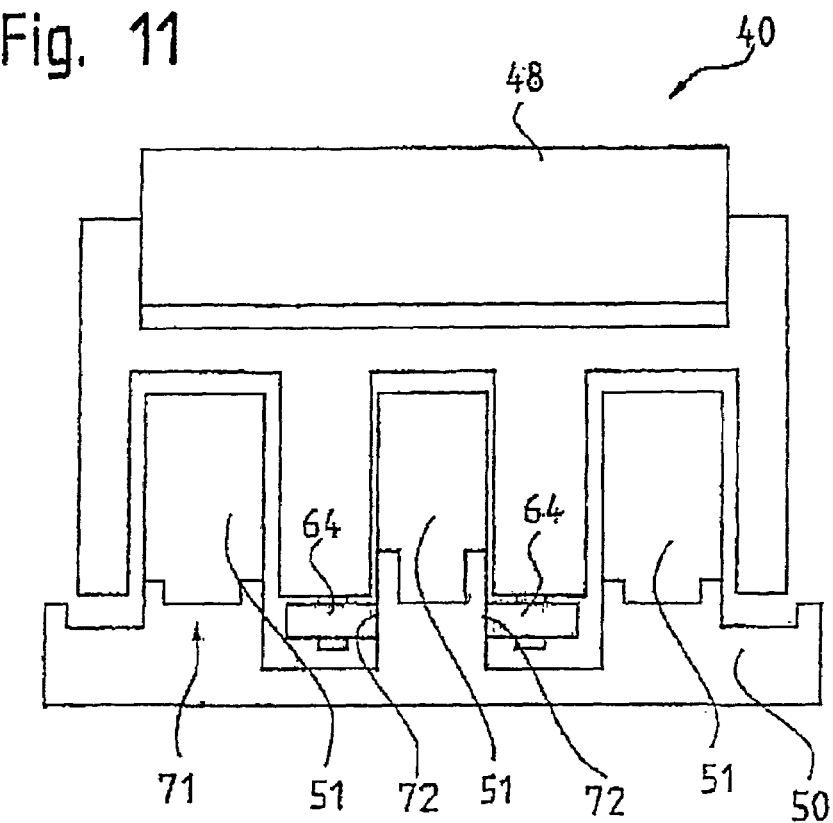
FIG. 11 is an end elevation view of the primary part guided on the secondary part of the drive motor.

FIG. 10 further allows recognition of guide surfaces 72 that ensure guidance of the excitation module 41 in the transverse direction "Y". The guide surface 72 can cooperate with the sliding guide surfaces 61, which are shown in FIG. 7, of the slide shoe 60 or with guide rollers 64 shown in FIG. 11. Provision of the slide shoe 60 or the guide rollers 64 depends on the respective case of use.

Figure 12A:
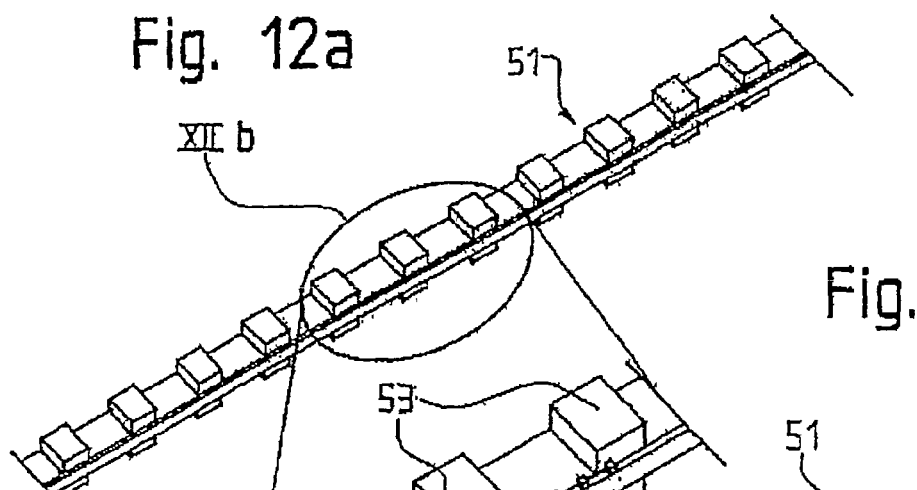
FIG. 12a is a perspective view of the rail of the secondary part.
Figure 12B:
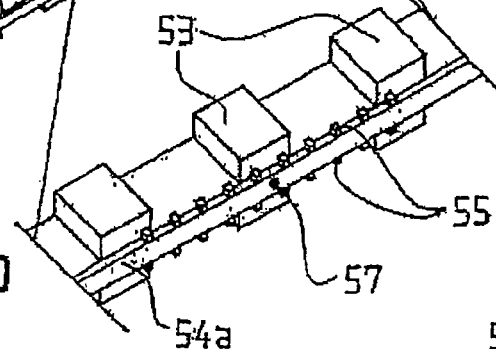
FIG. 12b is an enlarged illustration of a potion of the rail shown in FIG. 12 an identified by XIIb.
Figure 12C:
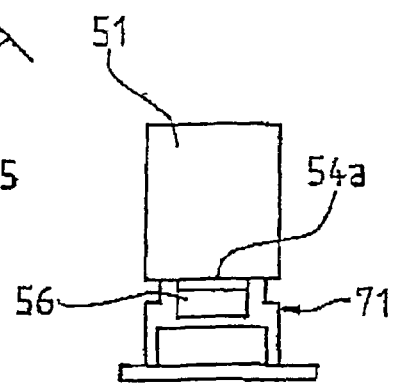
FIG. 12c is an end elevation view of the rail shown in FIG. 12a arranged on a support element by means of a fastening part.
Figure 14A:
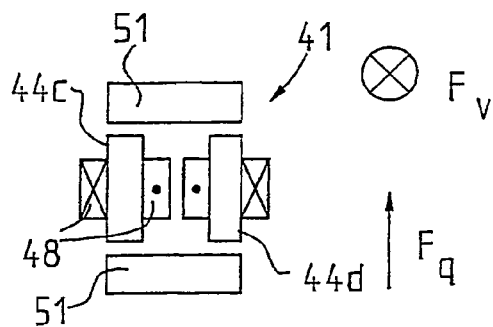
FIG. 14a is an end elevation view of the excitation module according to FIG. 2b with illustrated orientation of propulsive force and transverse force.

FIGS. 12a to 12c show that the rail 51 is fastened to the intermediate element 71 by means of the fastening part 54a. The fastening part 54a is arranged on a side of the rail 51 which is not provided with the teeth 53. The fastening part 54a can be an integral constituent of the rail 51 or a separate component connected with the rail 51. The fastening part 54a engages in the groove 56 of the intermediate element 71 and is connected with the intermediate element 71 in at least force-locking and shape-locking manner. For this purpose the fastening part 54a is provided with projections 55 and arranged by means of a press seat in the correspondingly designed groove 56. Alternatively or additionally, the intermediate element 71 and the fastening part 54a can be connected by means of a screw connection which engages in a bore 57 of the fastening part 54a. Depending on the respective case of use it can, in addition, be advantageous to weld the fastening part 54a and the intermediate element 71 together.

The shape-locking fastening of the fastening element 54a and thus the rail 51 to the intermediate element 71 offers the advantage of a simple alignment of the rail 51 or the segments 52 on the intermediate element 71 during mounting. Beyond that, the fastening part 54a contributes to an effective transmission of the force flow K to the intermediate element 71.

Figure 13:
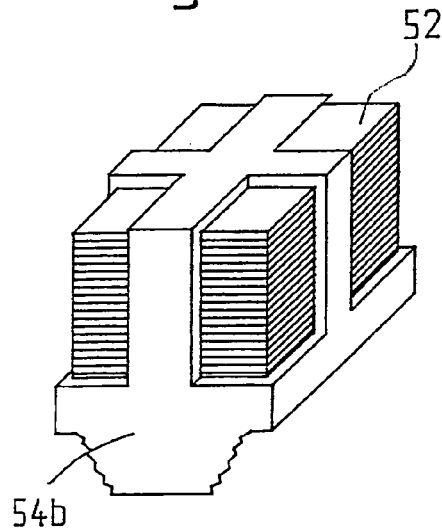
FIG. 13 is a perspective view of an alternate embodiment of the fastening part shown in FIG. 12c.
Figure 14B:
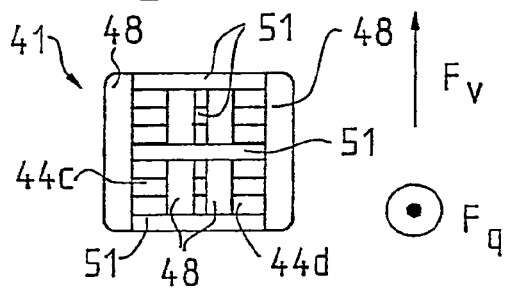
FIG. 14b is a plan view of the excitation module according to FIG. 14a with illustrated orientation of propulsive force and transverse force.
Figure 15A:
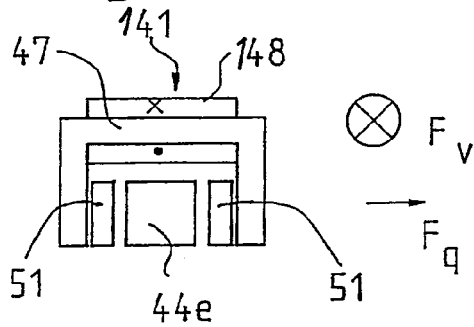
FIG. 15a is a front elevation view of the excitation module according to FIG. 3b with illustrated orientation of propulsive force and transverse force.
Figure 16A:
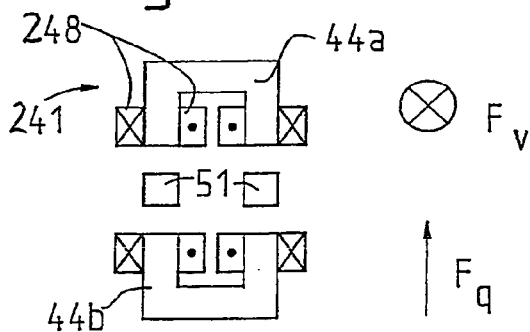
FIG. 16a is a front elevation view of the excitation module according to FIG. 4b with illustrated orientation of propulsive force and transverse force.
Figure 15B:
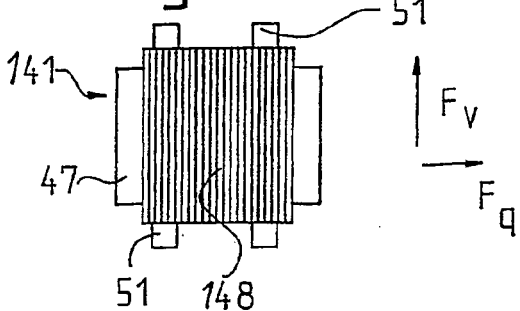
FIG. 15b is a plan view of the excitation module according to FIG. 15a with illustrated orientation of propulsive force and transverse force.
Figure 16B:
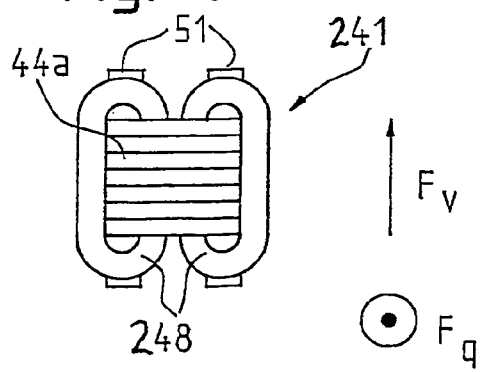
FIG. 16b is a plan view of the excitation module according to FIG. 16a with illustrated orientation of propulsive force and transverse force.

If the segments 52 or the teeth 53 are constructed as a plate stack, then it is advantageous to provide a fastening part 54b which is connected with the intermediate mounting element 71 by material couple, for example by ultrasound welding, and to hold the plate stack in the manner of a clamp. Such a fastening part 54b is illustrated in FIG. 13. The fastening part 54b is, with respect to economic production, made from a preferably thermoplastic synthetic material.

Apart from the propulsive force $F_v$ required for the movement of the elevator car 20, the excitation module 41, 141, 241 generates an unavoidable transverse force $F_q$. The orientation of the propulsive force $F_v$ and the transverse force $F_q$ in the case of the different forms of embodiment of the excitation module 41, 141, 241 according to FIGS. 2a through 4b is shown in FIGS. 14a through 16b. The propulsive force $F_v$ and the transverse force $F_q$ are not constant, but are subject to periodic fluctuations. In order to obtain an approximately constant propulsive force $F_v$, it is advantageous to arrange several of the excitation modules 41a, 41b one after the other, the supply voltages of which are displaced by a predetermined phase angle. Through a suitable selection of the phase angle the propulsive forces respectively generated by the excitation modules 41a, 41b can be superimposed to form a resultant propulsive force $F_{vR}$ which is substantially constant with respect to time. Beyond that, it is possible in this manner to provide compensation for or at least minimize the respective transverse forces $F_q$.

Figure 17A:
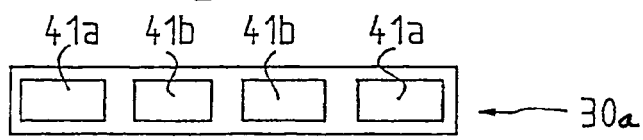
Figure 17B:
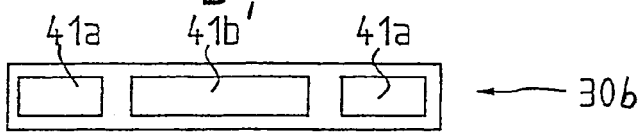
Figure 17C:
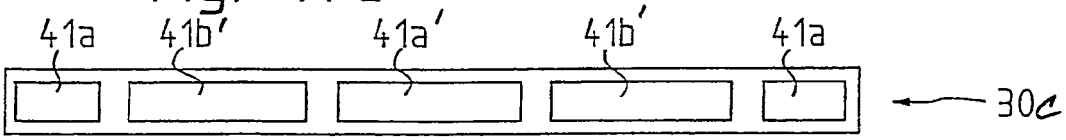

Different arrangements of several excitation modules 41a to 41d are shown in FIGS. 17a to 17l. In FIG. 17a there is illustrated a two-phase drive motor 30a which is composed of, in total, four excitation modules 41a, 41b, wherein the supply voltage of the excitation module 41a is displaced relative to the supply voltage of the excitation module 41b by a phase angle of 90°. A drive motor 30b illustrated in FIG. 17b differs from the drive motor 30a according to FIG. 17a in that only three excitation modules 41a, 41b', are provided, wherein the excitation module 41b' has twice the length of the excitation module 41a. The design, which is shown in FIG. 17c, of a drive motor 30c has, in total, five excitation modules 41a, 41a', 41b', arranged in alternation, wherein the middle excitation modules 41a', 41b' have over twice the length of the excitation modules 41a at the ends. In this manner a higher power capability of the drive motor 30c results.

Figure 17D:
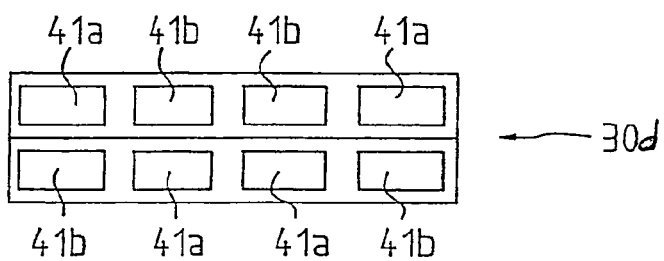
Figure 17E:
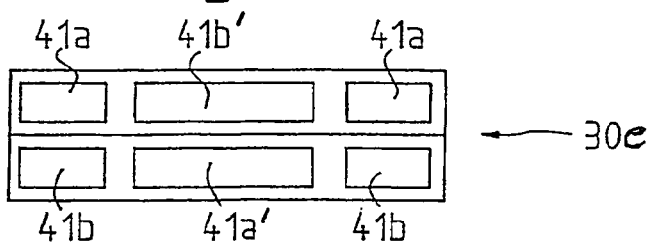

Drive motors 30d and 30e which have two rows of excitation modules arranged adjacent to one another are shown in FIGS. 17d and 17e respectively. The drive motor 30d according to FIG. 17d comprises, in total, eight of the excitation modules 41a, 41b, while the drive motor 30e according to FIG. 17e manages, for the same power capability, with six excitation modules, since the middle excitation modules 41a', 41b' have a greater length. In order to provide compensation for the transverse forces $F_q$ which arise, the excitation modules 41a, 41b and 41a', 41b' of which the supply voltages are displaced in phase are arranged adjacent to one another.

Figure 17F:
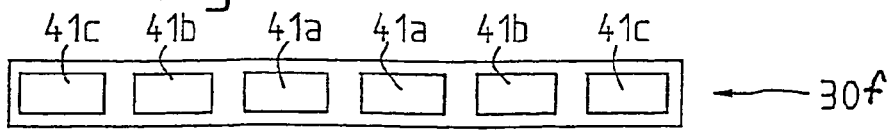
Figure 17G:
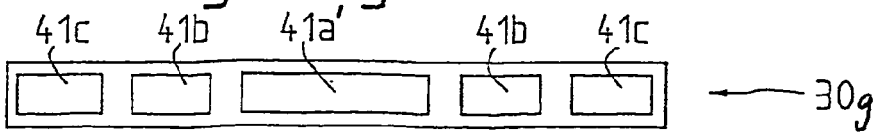

FIGS. 17f and 17g each show a three-phase drive motor 30f and 30g respectively. The drive motor 30f according to FIG. 17f is composed of, in total, six excitation modules 41a, 41b, 41c while the drive motor 30g according to FIG. 17g has, in total, five excitation modules 41a', 41b, 41c. The supply voltages of the excitation modules 41a or 41a', 41b, 41c are displaced by a phase angle in each instance of 120°.

Four-phase drive motors 30h and 30i are shown in FIGS. 17h and 17l respectively. The drive motor 30h according to FIG. 17h is composed of, in total, eight excitation modules 41a through 41d, which are arranged one after the other in the movement direction "X" and the supply voltages of which are displaced by a phase angle of in each instance 90°. The drive motor 30i according to FIG. 17i differs from the drive motor 30h according to FIG. 17h in that two excitation modules of the same phase are combined to form the center excitation module 41a'. In FIG. 17j there is shown a four-phase drive motor 30j which is composed of two rows of the excitation modules 41a through 41d. The excitation modules 41a through 41d are arranged in such a manner that mutually opposite excitation modules 41a, 41b; 41c, 41d are of unequal phase.

Four-phase drive motors 30k and 30l in which the excitation modules are arranged in two groups $G_1$ and $G_2$ are illustrated in FIGS. 17k and 17l respectively. The supply voltages of the excitation modules 41a, 41b or 41b', 41c, 41d or 41d' within a group $G_1$, $G_2$, are displaced each time by a phase angle of 90°, wherein the supply voltages of the excitation modules 41a, 41b or 41b' of the first group $G_1$ are displaced relative to the supply voltages of the excitation modules 41c, 41d or 41d' of the second group $G_2$ by a phase angle of 45°. This has the consequence that four phases each displaced by a phase angle of 45° are present, which generate the propulsive force $F_v$. By virtue of the grouped arrangement of the excitation modules there can be achieved a guidance of the excitation modules on the rails 51 which is simple with respect to construction. The reason for that is that due to the subdivision of the excitation modules 41a, 41b or 41b', 41c, 41d or 41d' into the groups $G_1$ and $G_2$ the guiding surface of the drive motor 30k, 30l is shortened.

In the case of presence of several the excitation modules 41a, 41b the propulsive force $F_{vR}$ driving the elevator car 20 is yielded as a resultant of the propulsive forces $F_{va}$, $F_{vb}$ generated by the individual excitation modules 41a, 41b, as can be recognized in FIG. 18a. The course of the individual propulsive forces $F_{va}$, $F_{vb}$ corresponds, in the case of a conventional supply voltage with an approximately trapezium-shaped current course, as shown in FIG. 18b, only approximately with the square form of a sinusoidal oscillation. The resultant propulsive force $F_{vR}$ is therefore subject to undesired fluctuations. In order to achieve a constant propulsive force $F_{vR}$, it is therefore necessary for the individual propulsive forces $F_{va}$, $F_{vb}$ of the excitation modules 41a, 41b to correspond exactly with the square form of a sinusoidal oscillation, as can be recognized in FIG. 19a. A course of that kind of the propulsive forces $F_{va}$, $F_{vb}$ of the individual excitation modules 41a, 41b results when the current strengths $I_a$, $I_b$ supplied to the excitation modules 41a, 41b are regulated. FIG. 19b shows the course of the current strengths $I_a$, $I_b$ which are regulated in such a manner that the course of the propulsive forces $F_{va}$, $F_{vb}$ produced by the excitation modules 41a, 41b each have the square form of a sinusoidal oscillation.

Figure 20:
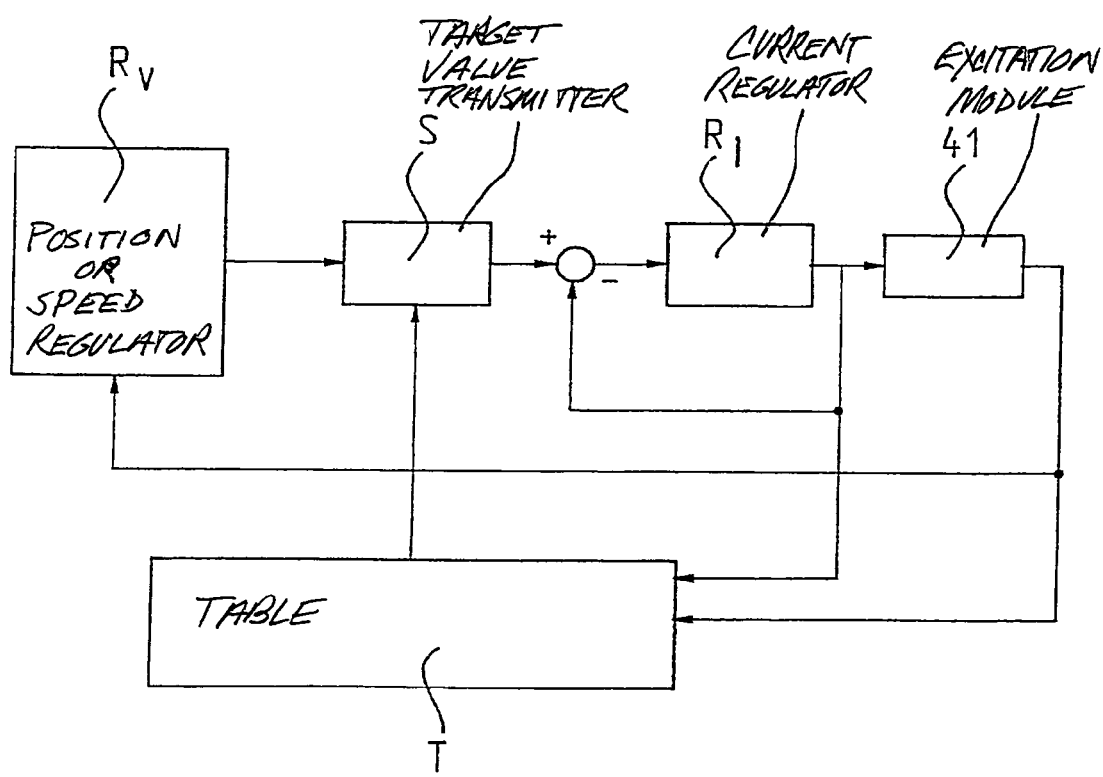
FIG. 20 is a schematic block diagram of the regulation of the current strength supplied to the excitation module of the drive motor.

In FIG. 20 there is illustrated a regulating circuit which clarifies the regulation of the current strength I. Apart from the excitation module 41, there are present in the regulating circuit a current regulator $R_I$, a target value transmitter S, a position or speed regulator $R_V$ and a table T. On the basis of the table T, the target value of the current I can be predetermined in dependence on the required propulsive force $F_v$ and the speed as well as the position of the elevator car 20. The target value of the current I is additionally influenced by the speed regulator $R_V$. The current regulator $R_I$ then regulates the current strength I, which is to be fed to the excitation module 41, in correspondence with the predetermined target value.

The above-described elevator is distinguished by a comparatively high power capability of the drive motor 30, which drives the elevator car 20, with comparatively low production costs. The reason for that is primarily the design of the drive motor 30 as a transverse flux motor with the primary part 40 and the secondary part 50. Through the construction of the secondary part 50 as the rail 51 divided into the segments 52, the effective magnetic flux M in transverse direction can be achieved. Not least, through the above-described arrangements of several excitation modules 41a through 41d and the regulation of the current strength I, which is to be supplied to the excitation module 41, a constant propulsive force $F_v$ can be ensured.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator, particularly for transporting persons, having an elevator shaft, an elevator car guided in the elevator shaft and a drive motor directly driving the elevator car, comprising:
   an active primary part of the drive motor arranged at the elevator car and having permanent magnets; and
   a passive secondary part of the drive motor arranged in a stationary position in the elevator shaft and spaced from said primary part by an air gap, the drive motor being formed as a transverse flux motor which moves said primary part linearly relative to said secondary part under an influence of an electromagnetic propulsive force, said secondary part including at least one rail made of a soft magnetic material and which is subdivided into a plurality of segments each of a predetermined length.

2. The elevator according to claim 1 wherein said at least one rail is fastened to a wall of the elevator shaft by at least one intermediate mounting element.

3. The elevator according to claim 2 wherein said at least one intermediate mounting element is provided with at least one of a first guide surface for guidance of said primary part in a transverse direction which is perpendicular to a movement direction of the elevator car and a second guide surface for guidance of said primary part in a normal direction which is perpendicular to the movement direction and the transverse direction.

4. The elevator according to claim 2 wherein said at least one intermediate mounting element is provided with at least one fastening part connected to said at least one rail and which is connected with said at least one intermediate mounting element in at least one of a force-locking, shape-locking and material-locking manner.

5. The elevator according to claim 4 wherein said at least one fastening part is provided with projections and inserted in shape-locking manner into a correspondingly formed groove of said at least one intermediate mounting element.

6. The elevator according to claim 2 wherein said at least one intermediate mounting element has chamfered ends.

7. The elevator according to claim 2 wherein said at least one intermediate mounting element is arranged on at least one support element fastened to the wall of the elevator shaft.

8. The elevator according to claim 7 where in said at least one intermediate mounting element and said at least one support element are made from the same material.

9. The elevator according to claim 8 where in said at least one intermediate mounting element and said at least one support element are made from a non-magnetic material, preferably aluminum.

10. The elevator according to claim 1 wherein said at least one rail is fastened to a wall of the elevator shaft by a plurality of intermediate mounting elements in one of a first construction with said segments connected together and said intermediate mounting elements spaced apart in a direction of movement of the elevator car and a second construction with said intermediate mounting elements connected together and said segments spaced apart in the direction of movement of the elevator car.

11. The elevator according to claim 1 wherein said at least one rail is fastened to a plurality of intermediate mounting elements and said intermediate mounting elements are fastened to a wall of the elevator shaft by a plurality of support elements in one of a first construction with said support elements connected together and said segments and said intermediate mounting elements spaced apart in a direction of movement of the elevator car and a second construction with said segments and said intermediate mounting elements connected together and said support elements spaced apart in the direction of movement of the elevator car.

12. The elevator according to claim 1 wherein said segments have the same said predetermined length.

13. The elevator according to claim 1 wherein said at least one rail is provided on at least one side with equidistantly arranged teeth, a tooth pitch of said teeth being an integral multiple of a pole pitch of said primary part.

14. The elevator according to claim 13 including another of said at least one rail offset longitudinally relative to said at least one rail by said tooth pitch.

15. The elevator according to claim 1 wherein said primary part includes at least one excitation module having at least one of guide rollers and a slide shoe for engaging said secondary part, said slide shoe having a sliding guide surface for at least one of guidance in a transverse direction perpendicular to a movement direction of the elevator car and guidance in a normal direction perpendicular to said movement direction and said transverse direction.

16. The elevator according to claim 15 wherein said sliding guide surface is formed of a resilient material.

17. The elevator according to claim 15 wherein said sliding guide surface is provided with chamfers for introducing said at least one rail into said at least one excitation module.

18. The elevator according to claim 1 wherein tat the elevator car is connected with a counterweight moved in the elevator shaft in an opposite sense to the elevator car and at least a portion of said primary part of the drive motor is arranged at said counterweight.

* * * * *

UNITED STATES PATENT AND TRADEMARK OFFICE
CERTIFICATE OF CORRECTION

| | | |
|---|---|---|
| PATENT NO. | : 7,261,186 B2 | Page 1 of 1 |
| APPLICATION NO. | : 10/902478 | |
| DATED | : August 28, 2007 | |
| INVENTOR(S) | : Romeo Deplazes et al. | |

It is certified that error appears in the above-identified patent and that said Letters Patent is hereby corrected as shown below:

On the title page, insert item [63]:

This application is a CON of PCT/CH03/00054 01/23/2003

On the title page, insert item [30]:

EUROPEAN PATENT OFFICE (EPO) 02405056.9 01/31/2002

EUROPEAN PATENT OFFICE (EPO) 02405057.7 01/31/2002

EUROPEAN PATENT OFFICE (EPO) 02405058.5 01/31/2002

Signed and Sealed this

Seventeenth Day of June, 2008

JON W. DUDAS
*Director of the United States Patent and Trademark Office*